United States Patent
Sakai et al.

(10) Patent No.: US 10,320,016 B2
(45) Date of Patent: Jun. 11, 2019

(54) HIGH-TEMPERATURE FUEL CELL SYSTEM

(71) Applicant: Panasonic Intellectual Property Management Co., Ltd., Osaka (JP)

(72) Inventors: Osamu Sakai, Osaka (JP); Kunihiro Ukai, Nara (JP); Yasushi Kaneko, Osaka (JP); Shigenori Onuma, Kyoto (JP); Takashi Kakuwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 15/590,859

(22) Filed: May 9, 2017

(65) Prior Publication Data
US 2017/0338505 A1    Nov. 23, 2017

(30) Foreign Application Priority Data

May 19, 2016    (JP) .................................. 2016-100266

(51) Int. Cl.
*C01B 3/06*    (2006.01)
*H01M 8/124*    (2016.01)
(Continued)

(52) U.S. Cl.
CPC ............. *H01M 8/0618* (2013.01); *C01B 3/06* (2013.01); *H01M 8/04022* (2013.01);
(Continued)

(58) Field of Classification Search
CPC .......... H01M 8/0618; H01M 8/04022; H01M 8/04074; H01M 8/0662; H01M 2008/1293; C01B 3/06
See application file for complete search history.

(56) References Cited

U.S. PATENT DOCUMENTS 5,208,114 A * 5/1993 Uematsu ............. H01M 8/0612
                                                     429/415
5,958,614 A * 9/1999 Takei ................... B60L 11/1881
                                                     429/413
(Continued)

FOREIGN PATENT DOCUMENTS

EP        456848 A1    11/1991
EP       2955153 A1    12/2015
(Continued)

OTHER PUBLICATIONS

The Extended European Search Report dated Jun. 23, 2017 for the related European Patent Application No. 17169723.8.

*Primary Examiner* — Gregg Cantelmo
(74) *Attorney, Agent, or Firm* — McDermott Will & Emery LLP

(57) ABSTRACT

A high-temperature fuel cell system includes a fuel cell that includes an anode and a cathode and that generates power by using a fuel gas and an oxidant gas, a fuel-gas path along which the fuel gas flows, an oxidant-gas path along which the oxidant gas flows, an anode-off-gas path along which an anode off-gas flows, a cathode-off-gas path along which a cathode off-gas flows, a combustion space in communication with the anode-off-gas path and the cathode-off-gas path and in which the anode off-gas and the cathode off-gas are burned, a flue-gas path along which a flue gas flows, a cathode-off-gas branch portion disposed on the cathode-off-gas path between the combustion space and the cathode and at which some of the cathode off-gas is branched from the cathode-off-gas path, and a first heat exchanger that enables heat exchange between the oxidant gas, the flue gas, and the cathode off-gas.

9 Claims, 7 Drawing Sheets

(51) Int. Cl.
*H01M 8/0612* (2016.01)
*H01M 8/0662* (2016.01)
*H01M 8/04007* (2016.01)
*H01M 8/04014* (2016.01)

(52) U.S. Cl.
CPC ..... *H01M 8/04074* (2013.01); *H01M 8/0662* (2013.01); *H01M 2008/1293* (2013.01)

(56) References Cited

U.S. PATENT DOCUMENTS

| 6,608,463 | B1* | 8/2003 | Kelly | H01M 8/04089 320/101 |
|---|---|---|---|---|
| 2008/0025886 | A1* | 1/2008 | Manabe | F23D 14/22 422/221 |

FOREIGN PATENT DOCUMENTS

| JP | 2012-153579 A | 8/2012 |
|---|---|---|
| JP | 2013-171636 | 9/2013 |

* cited by examiner

HIGH-TEMPERATURE FUEL CELL SYSTEM

BACKGROUND

1. Technical Field

The present disclosure relates to a high-temperature fuel cell system.

2. Description of the Related Art

Fuel cell systems have high power generation efficiency even when their size is small and can improve their total efficiency by using heat produced during power generation. Accordingly, fuel cell systems are used as power generators of distributed power generation systems. In particular, solid oxide fuel cells (referred to below as SOFCs), which operate at a high temperature by using a solid oxide as an electrolyte, have been developed as distributed power generation systems emphasizing high power generation efficiency.

In a fuel cell system, a fuel gas (typically, a reformed gas) and an oxidant gas (typically, air) are supplied to a SOFC for power generation. During power generation in the fuel cell system, some of the fuel gas supplied to an anode is not used for power generation and is discharged from the SOFC as an anode off-gas.

When the anode off-gas is burned by a burner, a high-temperature flue gas is produced. In many fuel cell systems, the flue gas in the burner is used to heat a reformer for generating a reformed gas. The SOFC operates at, for example, a high temperature of 600° C. or more and also generates a high-temperature cathode off-gas.

In view of this, it is effective for the SOFC to be formed integrally with an air heat exchanger for effective use of waste heat. For example, there is disclosed a system in which a SOFC is disposed at the center of the system, an air heat exchanger is disposed so as to surround the SOFC, and air to be supplied to the cathode of the SOFC is pre-heated (see, for example, Japanese Unexamined Patent Application Publication No. 2013-171636).

SUMMARY

In conventional examples, however, problems in the case where fuel utilization (Uf) is increased to operate a high-temperature fuel cell system with high efficiency have not been sufficiently considered. An aspect of the present disclosure has been accomplished in view of such circumstances, and one non-limiting and exemplary embodiment provides a high-temperature fuel cell system that can maintain an operating state better than in conventional fuel cell systems even when the fuel utilization (Uf) is increased to operate the high-temperature fuel cell system with high efficiency.

In one general aspect, the techniques disclosed here feature a high-temperature fuel cell system including a fuel cell that includes an anode and a cathode and that generates power by using a fuel gas and an oxidant gas, a fuel-gas path along which the fuel gas flows, an oxidant-gas path along which the oxidant gas flows, an anode-off-gas path along which an anode off-gas discharged from the anode flows, a cathode-off-gas path along which a cathode off-gas discharged from the cathode flows, a combustion space that is in communication with the anode-off-gas path and the cathode-off-gas path and in which the anode off-gas and the cathode off-gas are burned, a flue-gas path along which a flue gas discharged from the combustion space flows, a cathode-off-gas branch portion that is disposed on the cathode-off-gas path between the combustion space and the cathode and at which some of the cathode off-gas is branched from the cathode-off-gas path, and a first heat exchanger that enables heat exchange between the oxidant gas, the flue gas, and the cathode off-gas that has passed through the cathode off-gas branch portion.

The high-temperature fuel cell system according to the aspect of the present disclosure can maintain an operating state better than in conventional fuel cell systems even when the fuel utilization (Uf) is increased to operate the high-temperature fuel cell system with high efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
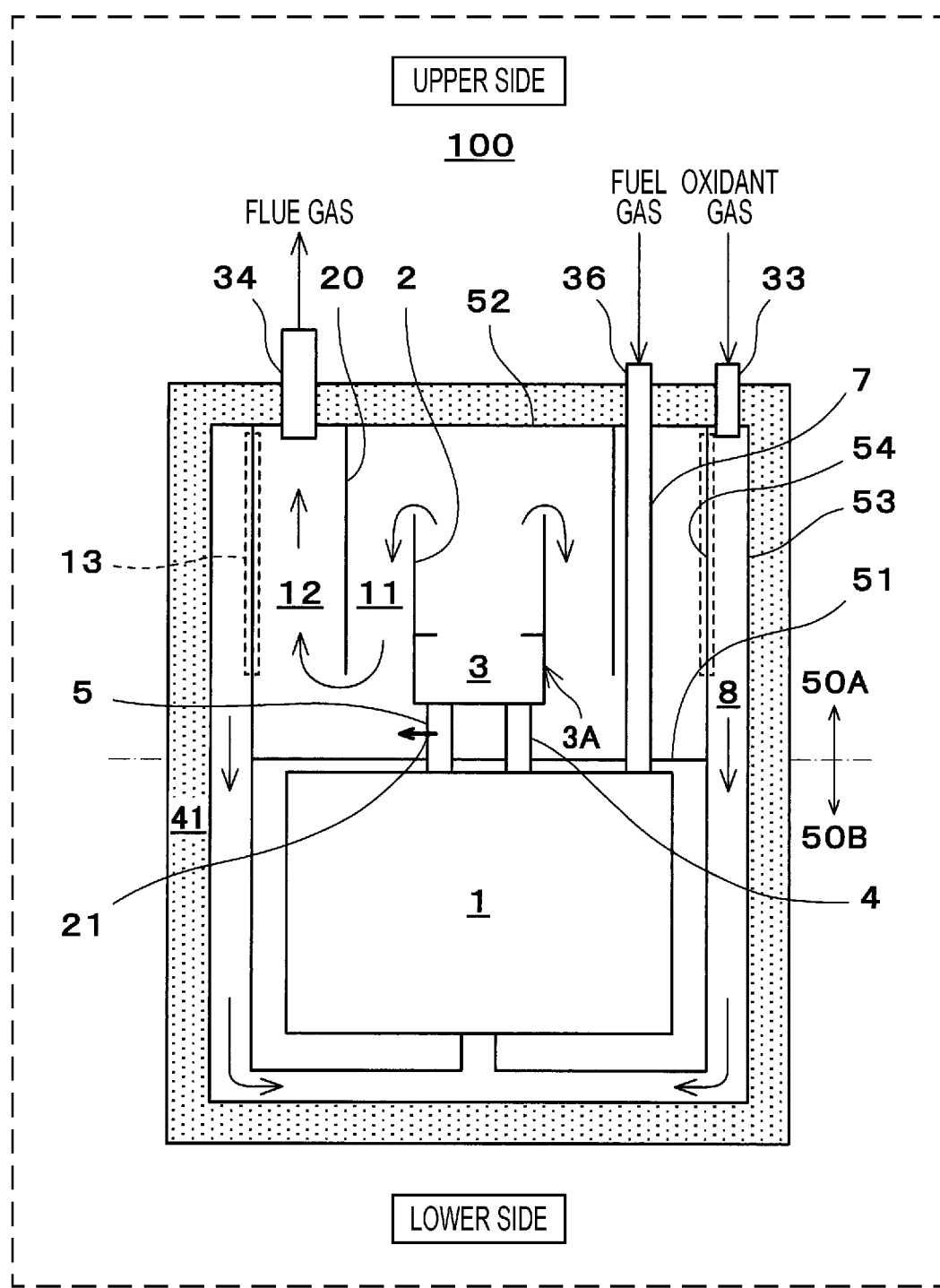
FIG. 1 illustrates a high-temperature fuel cell system according to a first embodiment.

The present inventors have diligently considered the problems in the case where the fuel utilization (Uf) is increased to operate a high-temperature fuel cell system with high efficiency and found the following.

As the fuel utilization (Uf) increases to operate a high-temperature fuel cell system with higher efficiency, the amount of an anode off-gas, which is a fuel supplied to a combustion space, decreases, and a ratio of the anode off-gas to a cathode off-gas decreases. In this state, combustion in the combustion space occurs with a small amount of the fuel, resulting in an excessive air ratio during combustion reaction. Consequently, there is a possibility that problems such as a misfire in the combustion space and an increase in concentration of carbon monoxide in a flue gas occur.

The present inventors have conceived that the possibility is reduced in a manner in which some of the cathode off-gas is branched before the cathode off-gas is supplied to the combustion space.

A high-temperature fuel cell system according to a first aspect of the present disclosure includes a fuel cell that includes an anode and a cathode and that generates power by using a fuel gas and an oxidant gas, a fuel-gas path along which the fuel gas flows, an oxidant-gas path along which the oxidant gas flows, an anode-off-gas path along which an anode off-gas discharged from the anode flows, a cathode-off-gas path along which a cathode off-gas discharged from the cathode flows, a combustion space that is in communication with the anode-off-gas path and the cathode-off-gas path and in which the anode off-gas and the cathode off-gas are burned, a flue-gas path along which a flue gas discharged from the combustion space flows, a cathode-off-gas branch portion that is disposed on the cathode-off-gas path between the combustion space and the cathode and at which some of the cathode off-gas is branched from the cathode-off-gas path, and a first heat exchanger that enables heat exchange between the oxidant gas, the flue gas, and the cathode off-gas that has passed through the cathode off-gas branch portion.

According to a second aspect of the present disclosure, the high-temperature fuel cell system according to the first aspect includes a mixing portion that is disposed on the flue-gas path and at which the flue gas and the cathode off-gas that has passed through the cathode-off-gas branch portion are mixed.

With this structure, an operating state better than in conventional fuel cell systems can be maintained even when the fuel utilization (Uf) is increased to operate the high-temperature fuel cell system with high efficiency.

Specifically, since some of the cathode off-gas is branched to the outside of the cathode-off-gas path at the cathode-off-gas branch portion, an air ratio in the combustion space can be inhibited from becoming excessive during the combustion reaction unlike the case of conventional high-temperature fuel cell systems, even when the fuel utilization (Uf) is increased to operate the high-temperature fuel cell system with high efficiency. Accordingly, the possibility of a misfire in the combustion space and the possibility of the occurrence of high-concentration carbon monoxide in the combustion space can be reduced more than in conventional high-temperature fuel cell systems, and a good combustion state in the combustion space can be maintained.

In addition, a high-temperature cathode off-gas that has passed through the cathode-off-gas branch portion can be effectively used as a heating fluid of the first heat exchanger to pre-heat the oxidant gas to be supplied to the cathode of the fuel cell.

A first embodiment, a first example and second example of the first embodiment, a second embodiment, and a third embodiment of the present disclosure will hereinafter be described with reference to the drawings. In the following specific examples, for example, components and the position and connection form of the components are described by way of example and do not limit the present disclosure. Among the components in the specific examples, components that are not recited in the independent claim showing the most generic concept of the present disclosure are described as arbitrary components. In the drawings, description of components designated by like symbols is omitted in some cases. In the drawings, each component is schematically illustrated for simplicity, and the shape and dimension thereof are not accurate in some cases.

First Embodiment

Structure of System

FIG. 1 illustrates a high-temperature fuel cell system according to the first embodiment.

In the following description, a solid oxide fuel cell system (referred to below as a SOFC system 100) including a solid oxide fuel cell (referred to below as a SOFC 1) serving as a power generator is taken as an example of the high-temperature fuel cell system, but the high-temperature fuel cell system is not limited to such. The structure of the high-temperature fuel cell system is not limited provided that the high-temperature fuel cell system is a fuel cell system that operates at a high temperature (for example, 600° C. or more). For example, instead of the SOFC system 100 described below, the high-temperature fuel cell system may be a molten carbonate fuel cell system including a molten carbonate fuel cell (MCFC) serving as a power generator.

For convenience, the "upper side" and "lower side" of the SOFC system 100 are illustrated in FIG. 1 (and other figures), and the gravity acts from the "upper side" to the "lower side".

According to the first embodiment illustrated in FIG. 1, the SOFC system 100 includes the SOFC 1, a combustion tube 2, a combustion space 3, a combustion chamber 3A, an anode-off-gas path 4, a cathode-off-gas path 5, a fuel-gas path 7, an oxidant-gas path 8, a flue-gas guide 20, a first flue-gas path 11, a second flue-gas path 12, a first heat exchanger 13, a cathode-off-gas branch portion 21, an oxidant-gas supply port 33, a flue-gas outlet 34, and a fuel-gas supply port 36.

In the SOFC system 100 according to the first embodiment, a partition wall 51 is disposed so as to partition the space on the inside of the inner wall 54 of the SOFC system 100 into an upper area 50A in which, for example, the combustion chamber 3A is accommodated and a lower area 50B in which, for example, the SOFC 1 is accommodated.

The SOFC 1 includes an anode and a cathode and generates power by using a fuel gas and an oxidant gas. Specifically, the SOFC 1 is formed such that multiple single cells of the SOFC 1 that generate power by using an oxidant gas and a fuel gas that are supplied from the outside are, for example, stacked and connected to each other in series. The SOFC 1 may be formed of stacked flat plate-shaped single cells or aggregated cylindrical single cells. The SOFC 1 of the SOFC system 100 according to the first embodiment is formed of a flat plate-shaped stack of the flat plate-shaped single cells and other components, an example of which is an interconnector. The SOFC system 100 includes a temperature sensor (not illustrated) that detects the operating temperature (for example, 600° C. or more) of the SOFC 1 and an electrode (not illustrated) through which a generated electric current flows from the SOFC 1 to the outside. The structure of the SOFC 1 is the same as the structure of a typical SOFC, and description of the detailed structure thereof is omitted.

The fuel-gas path 7 is a path along which the fuel gas flows. Specifically, the fuel gas from the fuel-gas supply port 36 passes along the fuel-gas path 7 and is subsequently supplied to the SOFC 1. The fuel-gas path 7 extends from the upper wall 52 of the SOFC system 100 to the SOFC 1 through the upper area 50A and the partition wall 51.

Examples of the fuel gas include a hydrogen gas and a reformed gas. Details of the SOFC system 100 in the case where the fuel gas is a reformed gas are described in a second embodiment.

The oxidant-gas path 8 is a path along which the oxidant gas flows. Specifically, the oxidant gas from the oxidant-gas supply port 33 passes along the oxidant-gas path 8 and is subsequently supplied to the SOFC 1. Examples of the oxidant gas include air.

The oxidant-gas path 8 is formed between the outer wall 53 and inner wall 54 of the SOFC system 100. The outer wall 53 and the inner wall 54 extend from the upper wall 52 to the lower side of the SOFC 1 and cover the bottom of the SOFC 1. Since the operating temperature of the SOFC system 100 becomes a high temperature (for example, 600° C. or more), the SOFC system 100 is typically covered by an insulating material 41 to suppress heat dissipation to the outside.

The anode-off-gas path 4 is a path along which the anode off-gas discharged from the anode of the SOFC 1 flows. Specifically, a fuel gas (anode off-gas) that is not used for power generation in the SOFC 1 flows to the anode-off-gas path 4, passes along the anode-off-gas path 4, and is subsequently supplied to the combustion space 3 in the combustion chamber 3A.

The cathode-off-gas path 5 is a path along which the cathode off-gas discharged from the cathode of the SOFC 1 flows. Specifically, an oxidant gas (cathode off-gas) that is not used for power generation in the SOFC 1 flows to the cathode-off-gas path 5, passes along the cathode-off-gas path 5, and is subsequently supplied to the combustion space 3 in the combustion chamber 3A.

The combustion space 3 is in communication with the anode-off-gas path 4 and the cathode-off-gas path 5. The anode off-gas and the cathode off-gas are burned in the combustion space 3. Specifically, the anode-off-gas path 4 and the cathode-off-gas path 5 extend from the lower area 50B, in which the SOFC 1 is accommodated, through the partition wall 51 and are connected to the combustion chamber 3A in the upper area 50A.

A high-temperature flue gas is thus produced in the combustion space 3. For example, an igniter and a combustion detector are disposed in the combustion chamber 3A. The structure thereof is the same as the structure of those of the combustion chamber of a typical SOFC system, and detailed description and drawings thereof are omitted.

The first flue-gas path 11 and the second flue-gas path 12 are paths along which the flue gas discharged from the combustion space 3 flows. The combustion tube 2 is disposed so as to surround the combustion space 3. Specifically, the combustion tube 2, which is tubular (for example, cylindrical), surrounds the combustion space 3 and extends vertically upward from the combustion chamber 3A around the combustion space 3.

The combustion tube 2 and the combustion chamber 3A thus form the combustion space 3, in which the anode off-gas and the cathode off-gas are burned by diffusion combustion.

The flue-gas guide 20, which is tubular (for example, cylindrical), is disposed outside the combustion tube 2 coaxially with the combustion tube 2. In the SOFC system 100 according to the first embodiment, the flue-gas guide 20 extends vertically downward from the upper wall 52 around the combustion tube 2. The lower end of the flue-gas guide 20 is lower than the upper end of the combustion tube 2 and does not impede the flue gas flowing along the first flue-gas path 11.

The first flue-gas path 11 is thus formed as a space between the combustion tube 2 and the flue-gas guide 20, and the second flue-gas path 12 is formed as a space between the flue-gas guide 20 and the inner wall 54. The flue-gas outlet 34 formed in the upper wall 52 is in communication with the second flue-gas path 12. Accordingly, the flue gas in the combustion space 3 is guided upward along the combustion tube 2, subsequently turns at the upper end of the combustion tube 2, and is guided to the first flue-gas path 11. The flue gas flowing along the first flue-gas path 11 is guided downward along the flue-gas guide 20, subsequently turns again at the lower end of the flue-gas guide 20, and is guided to the second flue-gas path 12.

The first heat exchanger 13 enables heat exchange between the oxidant gas flowing along the oxidant-gas path 8 and the flue gas flowing along the second flue-gas path 12. Specifically, at the first heat exchanger 13, part of the inner wall 54 that is exposed to the flue gas flowing along the second flue-gas path 12 functions as a heat-transfer surface. Thus, the oxidant gas having a normal temperature, which is a fluid to be heated of the first heat exchanger 13, is heated, and the flue gas having a high temperature, which is a heating fluid, is cooled and discharged from the flue-gas outlet 34 to the outside of the SOFC system 100. The flue gas discharged to the outside of the SOFC system 100 is supplied to, for example, a heat exchanger, not illustrated, that produces hot water for hot-water supply.

The cathode-off-gas branch portion 21 is disposed on the cathode-off-gas path 5 between the combustion space 3 and the cathode of the SOFC 1. Some of the cathode off-gas is branched into the outside of the cathode-off-gas path 5. The cathode off-gas that has passed through the cathode-off-gas branch portion 21, together with the flue gas, is used as the heating fluid of the first heat exchanger 13. That is, the first heat exchanger 13 enables heat exchange between the oxidant gas flowing along the oxidant-gas path 8 and a mixed gas of the flue gas flowing along the second flue-gas path 12 and the cathode off-gas that has passed through the cathode-off-gas branch portion 21. Specifically, it is preferable that, for example, the cathode off-gas that has passed through the cathode-off-gas branch portion 21 be not conducive to the combustion reaction in the combustion space 3 but be mixed with the flue gas near the lower end of the flue-gas guide 20. That is, the cathode off-gas that has passed through the cathode-off-gas branch portion 21 is mixed with the flue gas at a position upstream of the second flue-gas path 12 in the direction in which the flue gas flows. In other words, a mixing portion, at which the cathode off-gas that has passed through the cathode-off-gas branch portion 21 is mixed with the flue gas, is disposed upstream of the second flue-gas path 12. The cathode off-gas that has passed through the cathode-off-gas branch portion 21 may be mixed with the flue gas on the first flue-gas path 11 or on the second flue-gas path 12.

The cathode off-gas that has passed through the cathode-off-gas branch portion 21 and the flue gas flowing along the first flue-gas path 11 or the second flue-gas path 12 are thus mixed together outside the combustion space 3.

Specific examples of the cathode-off-gas branch portion 21 will be described in the first example and the second example.

The SOFC system 100 according to the first embodiment can maintain an operating state better than in conventional fuel cell systems even when the fuel utilization (Uf) is increased to operate the SOFC system 100 with high efficiency.

Specifically, since some of the cathode off-gas is branched into the outside of the cathode-off-gas path 5 at the cathode-off-gas branch portion 21, an air ratio in the combustion space 3 can be inhibited from becoming excessive during the combustion reaction unlike the case of conventional high-temperature fuel cell systems, even when the fuel utilization (Uf) is increased to operate the SOFC system 100 with high efficiency. Accordingly, the possibility of a misfire in the combustion space 3 and the possibility of the occurrence of high-concentration carbon monoxide in the combustion space 3 can be reduced more than in conventional high-temperature fuel cell systems, and a good combustion state in the combustion space 3 can be maintained.

In addition, in the SOFC system 100 according to the first embodiment, the high-temperature cathode off-gas that has passed through the cathode-off-gas branch portion 21 can be effectively used as the heating fluid of the first heat exchanger 13 to pre-heat the oxidant gas to be supplied to the cathode of the SOFC 1.

First Example

Figure 2:
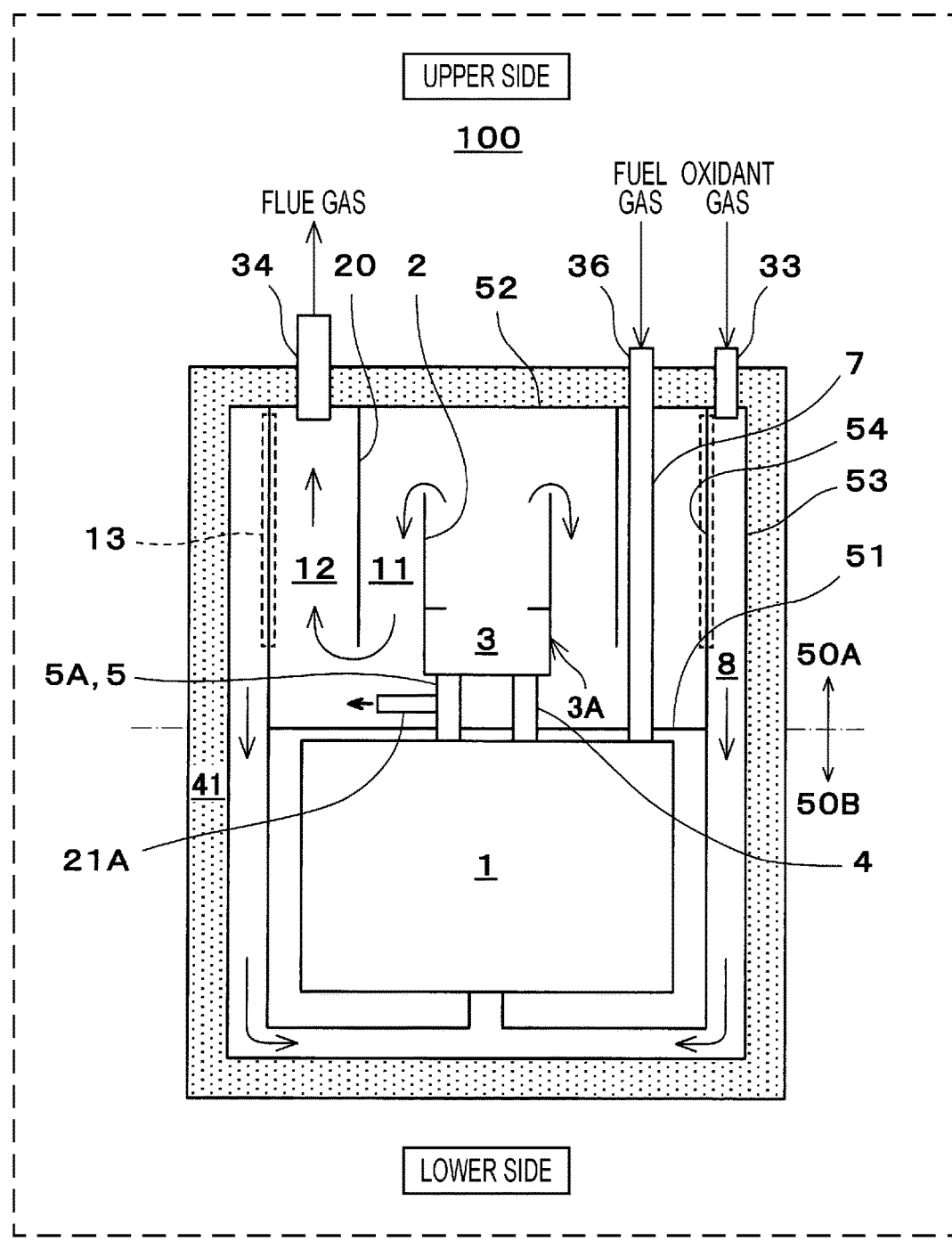
FIG. 2 illustrates a high-temperature fuel cell system according to a first example of the first embodiment.
Figure 3:
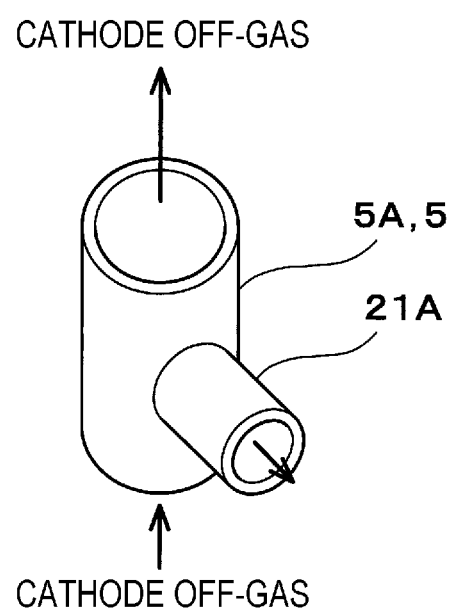
FIG. 3 illustrates the high-temperature fuel cell system according to the first example of the first embodiment.

FIG. 2 and FIG. 3 each illustrate a high-temperature fuel cell system according to the first example of the first embodiment. FIG. 3 is a perspective view of a cathode off-gas pipe 5A and a branch pipe 21A connected to the cathode off-gas pipe 5A that form the cathode-off-gas path 5 according to the first example.

According to the first example of the first embodiment, the cathode-off-gas branch portion 21 of the SOFC system 100 according to the first embodiment is specified as a branch from the cathode-off-gas path 5.

Specifically, the branch pipe 21A is disposed as the branch at an appropriate position on the cathode off-gas pipe 5A so as to be in communication with the inside of the cathode off-gas pipe 5A. As illustrated in FIG. 2, the cathode off-gas pipe 5A is connected to the combustion chamber 3A. Accordingly, the cathode off-gas that has passed through the cathode off-gas pipe 5A is conducive to the combustion reaction in the combustion space 3. The branch pipe 21A is not connected to the combustion chamber 3A and extends toward the first flue-gas path 11 outside the combustion tube 2. Accordingly, as illustrated in FIG. 2, the cathode off-gas that has passed through the branch pipe 21A is not conducive to the combustion reaction in the combustion space 3 but is mixed with the flue gas.

The flow rate of the cathode off-gas passing through the branch pipe 21A is determined such that an air ratio in the combustion space 3 can be appropriately inhibited from becoming excessive during the combustion reaction even when the fuel utilization (Uf) is increased to operate the SOFC system 100 with high efficiency. The flow rate of the cathode off-gas can be adjusted depending on, for example, the length or diameter of the branch pipe 21A.

In the first example, the branch pipe 21A is disposed on the cathode off-gas pipe 5A. However, such branch pipes may be disposed on the cathode off-gas pipe 5A.

Thus, some of the cathode off-gas flowing through the cathode off-gas pipe 5A can be readily branched into the outside of the cathode off-gas pipe 5A from the branch pipe 21A.

The structure of the SOFC system 100 according to the first example may be the same as the SOFC system 100 according to the first embodiment except for the above features.

Second Example

Figure 4:
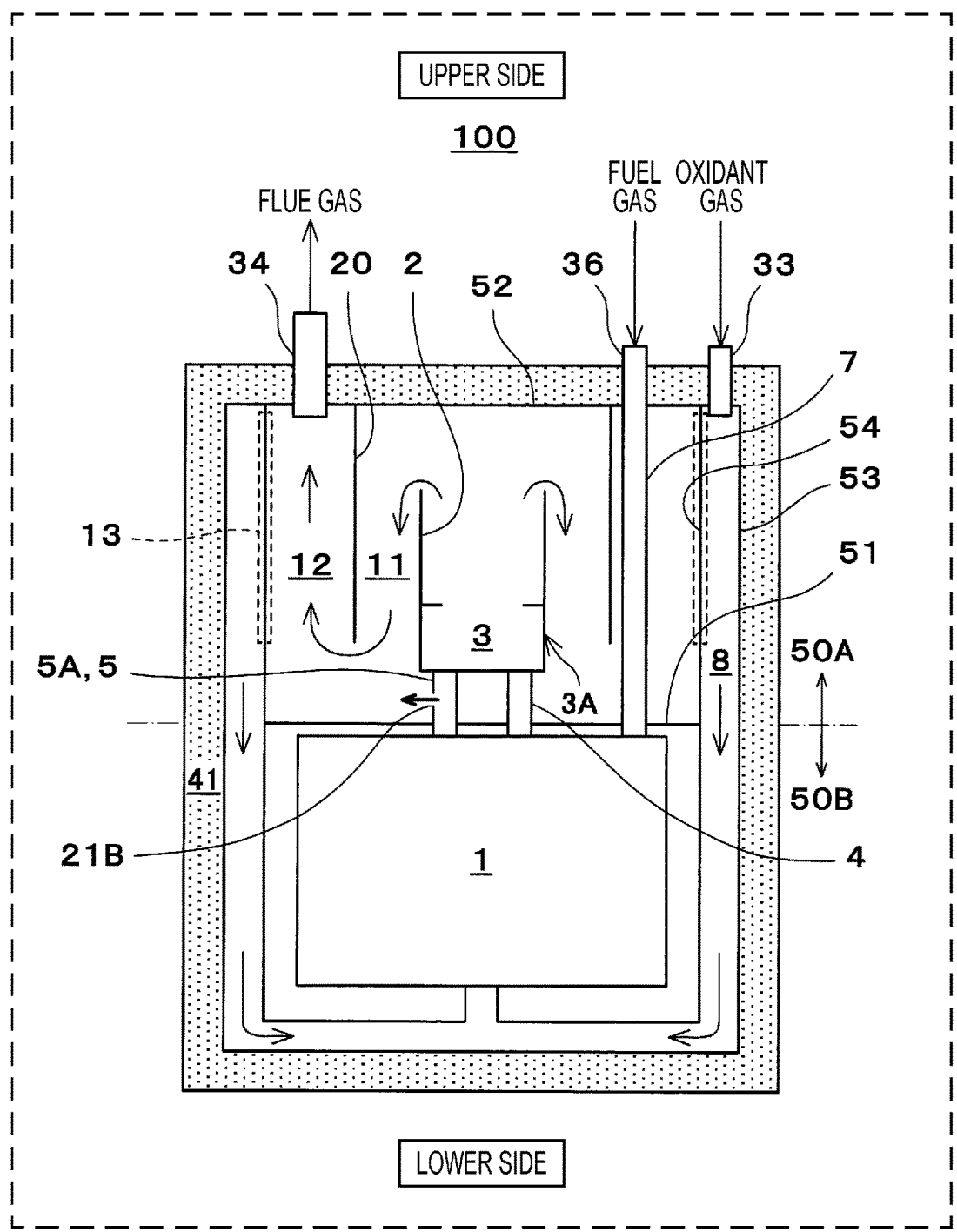
FIG. 4 illustrates a high-temperature fuel cell system according to a second example of the first embodiment.
Figure 5:
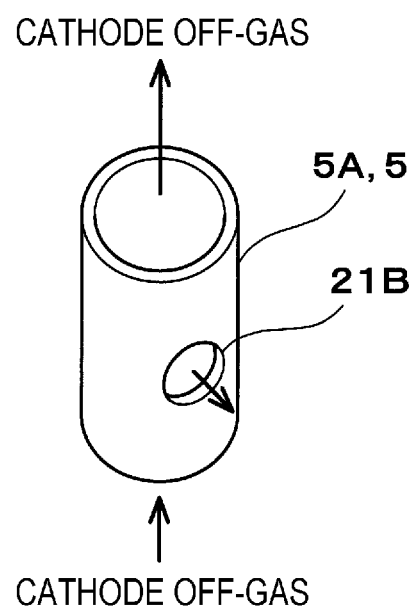
FIG. 5 illustrates the high-temperature fuel cell system according to the second example of the first embodiment.

FIG. 4 and FIG. 5 each illustrate a high-temperature fuel cell system according to the second example of the first embodiment. FIG. 5 is a perspective view of the cathode off-gas pipe 5A and a through-hole 21B formed in the cathode off-gas pipe 5A that form the cathode-off-gas path 5 according to the second example.

According to the second example of the first embodiment, the cathode-off-gas branch portion 21 of the SOFC system 100 according to the first embodiment is specified as an opening formed on the cathode-off-gas path 5.

Specifically, the through-hole 21B is formed as the opening at an appropriate position in the cathode off-gas pipe 5A. As illustrated in FIG. 4, the cathode off-gas pipe 5A is connected to the combustion chamber 3A. Accordingly, the cathode off-gas that has passed through the cathode off-gas pipe 5A is conducive to the combustion reaction in the combustion space 3. As illustrated in FIG. 4, the cathode off-gas that has passed through the through-hole 21B outside the combustion tube 2 is not conducive to the combustion reaction in the combustion space 3 but is mixed with the flue gas.

The flow rate of the cathode off-gas passing through the through-hole 21B is determined such that an air ratio in the combustion space 3 can be appropriately inhibited from becoming excessive during the combustion reaction even when the fuel utilization (Uf) is increased to operate the SOFC system 100 with high efficiency. The flow rate of the cathode off-gas can be adjusted depending on, for example, the diameter of the through-hole 21B.

In the second example, the through-hole 21B is formed in the cathode off-gas pipe 5A. However, such through-holes may be formed in the cathode off-gas pipe 5A.

Thus, some of the cathode off-gas flowing through the cathode off-gas pipe 5A can be readily branched into the outside of the cathode off-gas pipe 5A from the through-hole 21B.

The through-hole 21B can be formed more easily than, for example, in the case of disposing the branch on the cathode off-gas pipe 5A.

The structure of the SOFC system 100 according to the second example may be the same as the SOFC system 100 of the first embodiment except for the above features.

Second Embodiment

Figure 6:
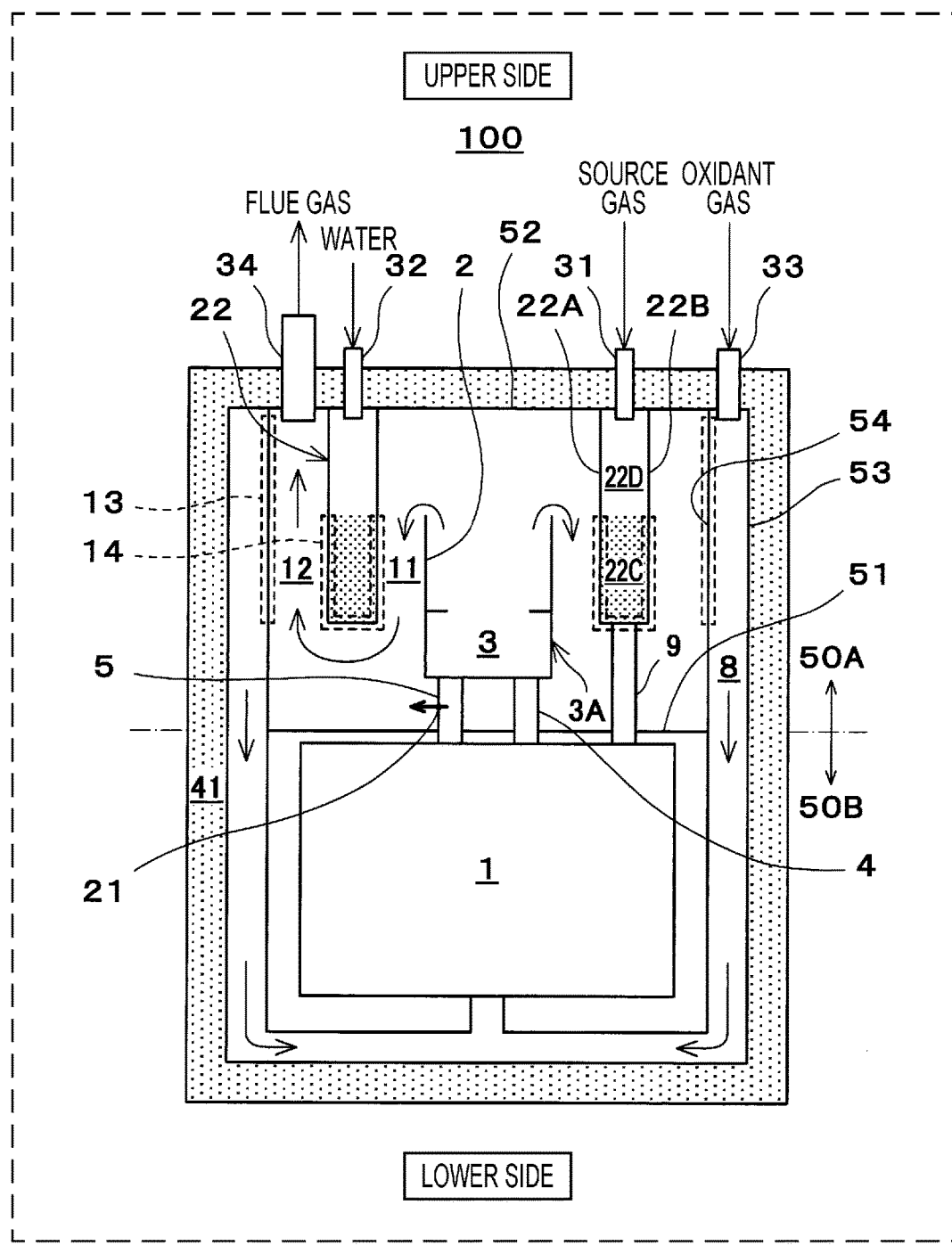
FIG. 6 illustrates a high-temperature fuel cell system according to a second embodiment.

FIG. 6 illustrates a high-temperature fuel cell system according to the second embodiment.

According to the second embodiment illustrated in FIG. 6, the SOFC system 100 includes the SOFC 1, the combustion tube 2, the combustion space 3, the combustion chamber 3A, the anode-off-gas path 4, the cathode-off-gas path 5, the oxidant-gas path 8, a reformed-gas path 9, a reformer 22, the first flue-gas path 11, the second flue-gas path 12, the first heat exchanger 13, a second heat exchanger 14, the cathode-off-gas branch portion 21, a water supply port 32, a source-gas supply port 31, the oxidant-gas supply port 33, and the flue-gas outlet 34.

The SOFC 1, the combustion tube 2, the combustion space 3, the combustion chamber 3A, the anode-off-gas path 4, the cathode-off-gas path 5, the oxidant-gas path 8, the first heat exchanger 13, the cathode-off-gas branch portion 21, the oxidant-gas supply port 33, and the flue-gas outlet 34 are the same as in the first embodiment, and detailed description thereof is omitted.

The reformer 22 produces a reformed gas containing hydrogen, as the fuel gas to be supplied to the SOFC 1, from a source gas. The reformed gas produced by the reformer 22 flows along the reformed-gas path 9 and is supplied to the SOFC 1.

Specifically, the reformer 22 includes an inner tube 22A (for example, a cylindrical body) formed coaxially with the combustion tube 2 with the inner tube 22A surrounding the combustion tube 2, an outer tube 22B (for example, a cylindrical body) formed coaxially with the inner tube 22A with the outer tube 22B surrounding the inner tube 22A, and a reforming catalyst 22C disposed between the inner tube 22A and the outer tube 22B. The reformer 22 produces the reformed gas in a manner in which the source gas is reformed by using the reforming catalyst 22C. The outer shell of the reformer 22 has a double tube structure including the inner tube 22A, the outer tube 22B, and the bottom. The reformed-gas path 9 is connected at an appropriate position to the bottom of the reformer 22. The reformed-gas path 9 extends from the bottom of the reformer 22 to the SOFC 1 through the upper area 50A and the partition wall 51.

In the SOFC system 100 according to the second embodiment, the inner tube 22A and the outer tube 22B extend vertically downward from the upper wall 52 around the combustion tube 2. The bottom of the reformer 22 is lower than the upper end of the combustion tube 2 and does not impede the flue gas flowing along the first flue-gas path 11.

The first flue-gas path 11 is thus formed as a space between the combustion tube 2 and the inner tube 22A, and the second flue-gas path 12 is formed as a space between the outer tube 22B and the inner wall 54. The flue-gas outlet 34 formed in the upper wall 52 is in communication with the second flue-gas path 12. Accordingly, the flue gas in the combustion space 3 is guided upward along the combustion tube 2, subsequently turns at the upper end of the combustion tube 2, and is guided to the first flue-gas path 11. The flue gas flowing along the first flue-gas path 11 is guided downward along the inner tube 22A, subsequently turns again at the bottom of the reformer 22, and is guided to the second flue-gas path 12.

Reforming reaction in the reformer 22 may be any type of reforming reaction. Examples of the reforming reaction include steam reforming reaction and autothermal reaction. At least one selected from the group consisting of a noble-metal-based catalyst such as Pt, Ru, and Rh and Ni may be typically used as the reforming catalyst 22C.

In the SOFC system 100 according to the second embodiment, the reforming reaction in the reformer 22 is steam reforming reaction. Accordingly, the reformer 22 includes a vaporizing portion 22D formed of the inner tube 22A and the outer tube 22B above the reforming catalyst 22C. That is, the lower portion of the reformer 22 is filled with the reforming catalyst 22C, and the vaporizing portion 22D is formed at the upper portion of the reformer 22. Water from the water supply port 32 is vaporized at the vaporizing portion 22D, the source gas from the source-gas supply port 31 and steam are mixed together at the vaporizing portion 22D. The mixed gas is supplied to the reforming catalyst 22C.

The source gas is a gas containing an organic compound including at least carbon and hydrogen such as town gas including methane as a primary component, natural gas, or liquefied petroleum gas (LPG).

The second heat exchanger 14 enables heat exchange between the reformer 22 and the flue gas. Specifically, at the second heat exchanger 14, the outer shell of the reformer 22, in which the reforming catalyst 22C exists, is exposed to the flue gas and functions as the heat-transfer surface. The reforming catalyst 22C in the reformer 22 is thus heated to about 600° C. The flue gas flows along the second flue-gas path 12 as the heating fluid of the first heat exchanger 13 and heats the oxidant gas flowing along the oxidant-gas path 8, as described above. At the same time, the flue gas also heats the vaporizing portion 22D in the reformer 22 with the outer tube 22B interposed therebetween.

In the SOFC system 100 according to the second embodiment, the cathode off-gas that has passed through the cathode-off-gas branch portion 21, together with the flue gas, is used as the heating fluid of the second heat exchanger 14. Specifically, the cathode off-gas that has passed through the cathode-off-gas branch portion 21 is not conducive to the combustion reaction in the combustion space 3 but is mixed with the flue gas near the bottom of the reformer 22. That is, the cathode off-gas is mixed with the flue gas at a position upstream of the second flue-gas path 12 in the direction in which the flue gas flows. The specific example of the cathode-off-gas branch portion 21 according to the second embodiment may be the branch pipe 21A as in the first example of the first embodiment or the through-hole 21B as in the second example of the first embodiment. Accordingly, detailed description of the specific example of the cathode-off-gas branch portion 21 is omitted.

In the SOFC system 100 according to the second embodiment, the high-temperature cathode off-gas that has passed through the cathode-off-gas branch portion 21 can be effectively used as the heating fluid of the second heat exchanger 14 to heat the reformer 22.

In addition, since some of the cathode off-gas is branched to the outside of the cathode-off-gas path 5 at the cathode-off-gas branch portion 21, an air ratio in the combustion space 3 can be inhibited from becoming excessive during the combustion reaction unlike the case of conventional high-temperature fuel cell systems, even when the fuel utilization (Uf) is increased to operate the SOFC system 100 with high efficiency as in the case of the SOFC system 100 according to the first embodiment. Accordingly, the possibility of a misfire in the combustion space 3 and the possibility of the occurrence of high-concentration carbon monoxide in the combustion space 3 can be reduced more than in conventional high-temperature fuel cell systems, and a good combustion state in the combustion space 3 can be maintained. Furthermore, the high-temperature cathode off-gas passing through the cathode-off-gas branch portion 21 can be effectively used as the heating fluid of the first heat exchanger 13 to pre-heat the oxidant gas to be supplied to the cathode of the SOFC 1.

The structure of the SOFC system 100 according to the second embodiment may be the same as the SOFC system 100 according to the first embodiment except for the above features.

Third Embodiment

Figure 7:
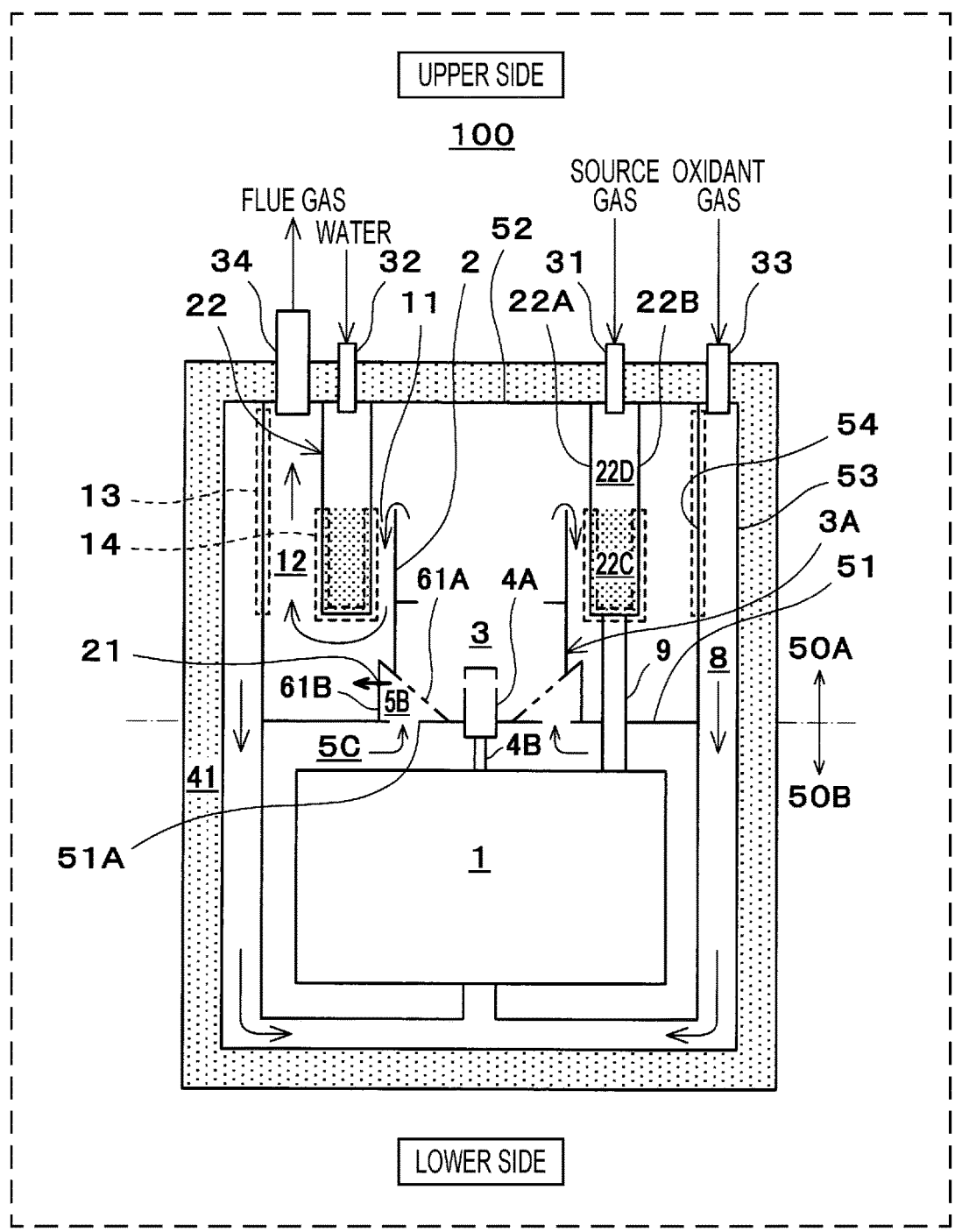
FIG. 7 illustrates a high-temperature fuel cell system according to a third embodiment.

FIG. 7 illustrates a high-temperature fuel cell system according to the third embodiment.

According to the third embodiment illustrated in FIG. 7, the SOFC system 100 includes the SOFC 1, the combustion tube 2, the combustion space 3, the combustion chamber 3A, the oxidant-gas path 8, the reformed-gas path 9, the reformer 22, the first flue-gas path 11, the second flue-gas path 12, the first heat exchanger 13, the second heat exchanger 14, the cathode-off-gas branch portion 21, the water supply port 32, the source-gas supply port 31, the oxidant-gas supply port 33, the flue-gas outlet 34, an anode-off-gas ejecting portion 4A, and a cathode-off-gas gathering portion 5B.

The SOFC 1, the combustion tube 2, the combustion space 3, the oxidant-gas path 8, the reformed-gas path 9, the reformer 22, the first flue-gas path 11, the second flue-gas path 12, the first heat exchanger 13, the second heat exchanger 14, the water supply port 32, the source-gas supply port 31, the oxidant-gas supply port 33, and the flue-gas outlet 34 are the same as in the second embodiment, and detailed description thereof is omitted.

The anode-off-gas ejecting portion 4A forms part of the anode-off-gas path and ejects the anode off-gas into the combustion space 3. Specifically, a path 4B extending from the SOFC 1 is connected to the bottom of the anode-off-gas ejecting portion 4A. The anode off-gas discharged from the anode of the SOFC 1 flows along the path 4B and is supplied to the anode-off-gas ejecting portion 4A.

The cathode-off-gas gathering portion 5B forms part of the cathode-off-gas path. The cathode off-gas gathers at the cathode-off-gas gathering portion 5B. Specifically, the cathode-off-gas path is formed of the cathode-off-gas gathering portion 5B and a space 5C between the outer shell of the SOFC 1 and the partition wall 51. The cathode-off-gas gathering portion 5B is in communication with the space 5C via a communication hole 51A formed in the partition wall 51.

The cathode-off-gas gathering portion 5B includes a passage member including a tubular (for example, cylindrical) peripheral wall 61B surrounding the anode-off-gas ejecting portion 4A and a diffuser panel 61A having cathode-off-gas ejection holes through which the cathode off-gas is ejected into the combustion space 3 inside the peripheral wall 61B. That is, the cathode-off-gas gathering portion 5B surrounds the anode-off-gas ejecting portion 4A.

Specifically, as illustrated in FIG. 7, the combustion chamber 3A is hollowed so as to be tapered from the combustion tube 2 toward the partition wall 51. The hollow forms the combustion space 3 for the anode off-gas and the cathode off-gas. The anode-off-gas ejecting portion 4A extends vertically upward with respect to the partition wall 51 at the center of the bottom of the hollow. The anode-off-gas ejecting portion 4A is formed in a cylindrical shape with a lid and a bottom. Anode off-gas ejection holes are formed at predetermined positions in the side surface of the anode-off-gas ejecting portion 4A. The anode-off-gas ejecting portion 4A enables the anode off-gas to be ejected from the anode off-gas ejection holes into the combustion space 3. The diffuser panel 61A, which enables the cathode off-gas to be ejected, is disposed around the central axis of the anode-off-gas ejecting portion 4A so as to surround the anode-off-gas ejecting portion 4A. The diffuser panel 61A forms the sloped surface of the tapered hollow. The cathode-off-gas ejection holes are formed so as to face the respective anode off-gas ejection holes.

The cathode-off-gas branch portion 21 is disposed on the peripheral wall 61B.

The specific example of the cathode-off-gas branch portion 21 according to the third embodiment may be the branch pipe 21A as in the first example of the first embodiment or the through-hole 21B as in the second example of the first embodiment. Accordingly, detailed description of the specific example of the cathode-off-gas branch portion 21 is omitted.

In the SOFC system 100 according to the third embodiment, since the cathode off-gas gathers at the cathode-off-gas gathering portion 5B, the dispersibility of the cathode off-gas ejected through the diffuser panel 61A can be improved, even when the fuel utilization (Uf) is increased to operate the SOFC system 100 with high efficiency. Since the cathode-off-gas ejection holes and the anode off-gas ejection holes are formed so as to substantially face each other, a jet of the anode off-gas ejected from the anode off-gas ejection holes and a jet of the cathode off-gas ejected from the cathode-off-gas ejection holes collide with each other. This improves miscibility of the cathode off-gas and the anode off-gas in the combustion space 3.

In addition, since some of the cathode off-gas is branched to the outside of the cathode-off-gas gathering portion 5B at the cathode-off-gas branch portion 21, an air ratio in the combustion space 3 can be inhibited from becoming excessive during the combustion reaction unlike the case of conventional high-temperature fuel cell systems, even when the fuel utilization (Uf) is increased to operate the SOFC system 100 with high efficiency as in the case of the SOFC system 100 according to the first embodiment. Accordingly, the possibility of a misfire in the combustion space 3 and the possibility of the occurrence of high-concentration carbon monoxide in the combustion space 3 can be reduced more than in conventional high-temperature fuel cell systems, and a good combustion state in the combustion space 3 can be maintained.

Furthermore, the high-temperature cathode off-gas passing through the cathode-off-gas branch portion 21 can be effectively used as the heating fluid of the first heat exchanger 13 and the second heat exchanger 14 to pre-heat the oxidant gas to be supplied to the cathode of the SOFC 1 and to heat the reformer 22 as in the case of the SOFC system 100 according to the second embodiment.

The structure of the SOFC system 100 according to the third embodiment may be the same as the SOFC system 100 of the second embodiment except for the above features.

The first embodiment, the first example of the first embodiment, the second example of the first embodiment, the second embodiment, and the third embodiment can be combined with each other unless they exclude each other. For example, the SOFC system 100 according to the third embodiment corresponds to an example of the SOFC system 100 according to the second embodiment in which the combustion chamber 3A includes the anode-off-gas ejecting portion 4A and the cathode-off-gas gathering portion 5B. The SOFC system 100 according to the first embodiment may include the anode-off-gas ejecting portion 4A and the cathode-off-gas gathering portion 5B.

Various modifications and other embodiments of the present disclosure become obvious to a person skilled in the art from the above description. Accordingly, the description should be interpreted as an example and is provided to teach the best mode for carrying out the present disclosure to a person skilled in the art. The detailed structure and/or function of the present disclosure can be substantially modified without departing from the concept of the present disclosure.

The high-temperature fuel cell system according to the aspect of the present disclosure can maintain an operating state better than in conventional fuel cell systems even when the fuel utilization (Uf) is increased to operate the high-temperature fuel cell system with high efficiency. Accordingly, the aspect of the present disclosure can be applied to a high-temperature fuel cell system such as a SOFC system.

What is claimed is:

1. A high-temperature fuel cell system comprising:
    an inner wall and an outer wall surrounding the inner wall;
    a partition wall disposed so as to partition a space on inside of the inner wall into an upper area and a lower area;
    a fuel cell that is disposed in the lower area and includes an anode and a cathode and that generates power by using a fuel gas and an oxidant gas;
    a fuel-gas path passing through the partition wall, along which the fuel gas flows;
    an oxidant-gas path formed by the inner wall and the outer wall, along which the oxidant gas flows;
    an anode-off-gas path along which an anode off-gas discharged from the anode flows;
    a cathode-off-gas path along which a cathode off-gas discharged from the cathode flows;
    a combustion space that is disposed in the upper area and is in communication with the anode-off-gas path and the cathode-off-gas path and in which the anode off-gas and the cathode off-gas are burned;
    a flue-gas path along which a flue gas discharged from the combustion space flows;
    a cathode-off-gas branch portion that is disposed on the cathode-off-gas path between the combustion space and the cathode and at which some of the cathode off-gas is branched from the cathode-off-gas path; and a first heat exchanger that enables heat exchange between the oxidant gas, the flue gas, and the cathode off-gas that has passed through the cathode off-gas branch portion.

2. The high-temperature fuel cell system according to claim 1, further comprising:

a mixing portion that is disposed on the flue-gas path and at which the flue gas and the cathode off-gas that has passed through the cathode-off-gas branch portion are mixed.

3. The high-temperature fuel cell system according to claim 1, further comprising:

a reformer that generates, from a source gas, a reformed gas containing hydrogen used as the fuel gas to be supplied to the fuel cell; and a second heat exchanger that enables heat exchange between the reformer and the flue gas, wherein the cathode off-gas that has passed through the cathode-off-gas branch portion, together with the flue gas, is used as a heating fluid of the second heat exchanger.

4. The high-temperature fuel cell system according to claim 1, further comprising:

an anode-off-gas ejecting portion that forms part of the anode-off-gas path and from which the anode off-gas is ejected into the combustion space; and a cathode-off-gas gathering portion that forms part of the cathode-off-gas path and at which the cathode off-gas gathers, wherein the cathode-off-gas gathering portion includes a passage member including a cylindrical peripheral wall surrounding the anode-off-gas ejecting portion and a diffuser panel having a cathode-off-gas ejection hole through which the cathode off-gas is ejected into the combustion space inside the peripheral wall, and wherein the cathode-off-gas branch portion is formed on the peripheral wall.

5. The high-temperature fuel cell system according to claim 1, wherein the cathode-off-gas branch portion is a branch from the cathode-off-gas path.

6. The high-temperature fuel cell system according to claim 1, wherein the cathode-off-gas branch portion is an opening formed on the cathode-off-gas path.

7. The high-temperature fuel cell system according to claim 1, further comprising:

a combustion tube and a combustion chamber that define the combustion space, wherein the cathode off-gas that has passed through the cathode-off-gas branch portion and the flue gas passing along the flue-gas path are mixed outside the combustion space.

8. The high-temperature fuel cell system according to claim 1, wherein the fuel cell has a cylindrical shape.

9. A high-temperature fuel cell system comprising:

a fuel cell that includes an anode and a cathode and that generates power by using a fuel gas and an oxidant gas;

a fuel-gas path along which the fuel gas flows;

an oxidant-gas path along which the oxidant gas flows;

an anode-off-gas path along which an anode off-gas discharged from the anode flows;

a cathode-off-gas path along which a cathode off-gas discharged from the cathode flows;

a combustion space that is in communication with the anode-off-gas path and the cathode-off-gas path and in which the anode off-gas and the cathode off-gas are burned;

a flue-gas path along which a flue gas discharged from the combustion space flows;

a cathode-off-gas branch portion that is disposed on the cathode-off-gas path between the combustion space and the cathode and at which some of the cathode off-gas is branched from the cathode-off-gas path;

a first heat exchanger that enables heat exchange between the oxidant gas, the flue gas, and the cathode off-gas that has passed through the cathode off-gas branch portion;

an anode-off-gas ejecting portion that forms part of the anode-off-gas path and from which the anode off-gas is ejected into the combustion space; and a cathode-off-gas gathering portion that forms part of the cathode-off-gas path and at which the cathode off-gas gathers, wherein:

the cathode-off-gas gathering portion includes a passage member including a cylindrical peripheral wall surrounding the anode-off-gas ejecting portion and a diffuser panel having a cathode-off-gas ejection hole through which the cathode off-gas is ejected into the combustion space inside the peripheral wall, and wherein the cathode-off-gas branch portion is formed on the peripheral wall.

* * * * *